(12) United States Patent
Loscalzo

(10) Patent No.: US 9,338,903 B1
(45) Date of Patent: May 10, 2016

(54) MOBILE DEVICE CRADLE

(71) Applicant: John Loscalzo, Hopatcong, NJ (US)

(72) Inventor: John Loscalzo, Hopatcong, NJ (US)

( * ) Notice: Subject to any disclaimer, the term of this patent is extended or adjusted under 35 U.S.C. 154(b) by 0 days.

(21) Appl. No.: 14/606,806

(22) Filed: Jan. 27, 2015

(51) Int. Cl.
  *F16M 11/00* (2006.01)
  *H05K 5/02* (2006.01)
  *A47B 23/04* (2006.01)

(52) U.S. Cl.
  CPC ............ *H05K 5/0204* (2013.01); *A47B 23/042* (2013.01)

(58) Field of Classification Search
  CPC ............................ A47B 23/042; H05K 5/0204
  USPC ........... 248/146, 152, 158, 174, 176.1, 176.2, 248/310, 316.8, 346.03, 346.5, 918, 450, 248/671, 441.1; 40/124.07, 658; D14/447
  See application file for complete search history.

(56) References Cited

U.S. PATENT DOCUMENTS

| | | | | |
|---|---|---|---|---|
| 6,059,249 A | * | 5/2000 | Scatterday | G09F 1/14 248/450 |
| D477,920 S | * | 8/2003 | McCarty et al. | D6/310 |
| D502,510 S | * | 3/2005 | Hsu | D19/90 |
| 7,969,732 B1 | * | 6/2011 | Noble | F16M 11/041 248/917 |
| D659,696 S | * | 5/2012 | Lanza | D14/447 |
| D693,353 S | * | 11/2013 | Shu et al. | D14/447 |
| D703,215 S | * | 4/2014 | Alesi et al. | D14/447 |
| 8,720,678 B2 | | 5/2014 | Shifferaw | |
| D711,366 S | * | 8/2014 | Lui et al. | D14/253 |
| 2013/0023312 A1 | | 1/2013 | Staebler | |
| 2013/0217448 A1 | | 8/2013 | Kim et al. | |

FOREIGN PATENT DOCUMENTS

KR    WO2014171664 A1    10/2014

* cited by examiner

*Primary Examiner* — Gwedolyn W Baxter
(74) *Attorney, Agent, or Firm* — Thomas J. Germinario

(57) ABSTRACT

A cradle securely supports a mobile device with the display screen at an optimal viewing angle, while leaving virtually the entire front sides and back areas of the device open and exposed to ambient air for maximum heat dissipation. Structurally, the cradle can be carved out of a standard disposable coffee container, so that it can be inexpensively fabricated from a modified coffee container mold. The cradle material can be a light-weight plastic, such as styrofoam.

3 Claims, 2 Drawing Sheets

MOBILE DEVICE CRADLE

BACKGROUND OF THE INVENTION

The present invention relates to the field of supports and cradles for mobile phones and other mobile devices. More particularly, the present invention relates to the field of cradles for mobile devices which enable hands-free viewing of video and/or graphic content.

SUMMARY OF THE INVENTION

Mobile phones and tables are increasingly used for viewing streaming video content, including sporting events, television and movies. In viewing such content, the display screen of the mobile device is typically oriented horizontally, similar to a television or movie screen. Manually holding the mobile device in the optimal viewing position, however, is at best awkward and inconvenient, and it is often impossible if the viewer is simultaneously engaged in other manual activities.

Therefore, the need arises for a device that will provide a hands-free cradle for the mobile device which securely retains the device in a horizontal position, with the viewing screen reclined at approximately 60 degrees for optimal viewing. The cradle should be portable and light-weight so as to be conveniently carried by the user, and it should have an open structure so as to allow for maximum heat dissipation from the mobile device.

The present invention is a cradle for mobile devices comprising an annular frusto-conical cradle base, having a diameter of 3 to 6 inches and a height of 0.75 to 1.5 inches. Surmounting the cradle base and extending upward therefrom are a front flange and a rear flange. The front flange is a crescent-shaped arcuate frusto-conical section subtending a chord of length 2.5 to 4.5 inches. The front flange has two lateral edges that are splayed at an acute angle of between 50 and 70 degrees. The rear flange is a crescent-shaped arcuate frusto-conical section subtending a chord of length 3 to 6 inches. The rear flange has two lateral edges that are beveled at acute angle between 50 and 70 degrees, such that the lateral edges of the front and rear flanges are substantially parallel to each other. Between the lateral edges of the front and rear flanges there are gaps of 0.5 to 1.5 inches, within which the mobile device can rest at an angle of between 50 and 70 degrees.

The mobile device cradle of the present invention securely supports the mobile device with the display screen at an optimal viewing angle, while leaving virtually the entire front sides and back areas of the device open and exposed to ambient air for maximum heat dissipation.

Structurally, this cradle can be carved out of a standard disposable coffee container, so that it can be inexpensively fabricated from a modified coffee container mold. The cradle material can be a light-weight plastic, such as styrofoam.

The foregoing summarizes the general design features of the present invention. In the following sections, a specific embodiment of the present invention will be described in some detail. This specific embodiment is intended to demonstrate the feasibility of implementing the present invention in accordance with the general design features discussed above. Therefore, the detailed description of this embodiment is offered for illustrative and exemplary purposes only, and it is not intended to limit the scope either of the foregoing summary description or of the claims which follow.

DETAILED DESCRIPTION OF THE PREFERRED EMBODIMENT

Figure 1:
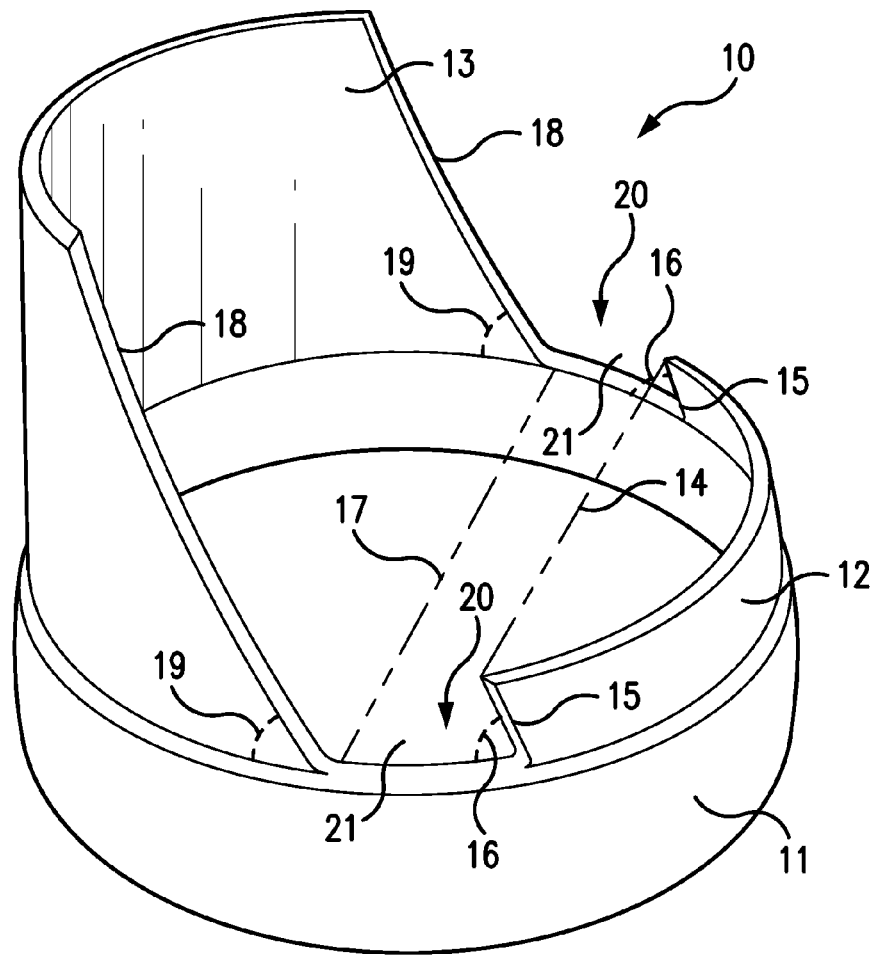
FIG. 1 is a side perspective view of a mobile device cradle according to the preferred embodiment of the present invention.
Figure 2:
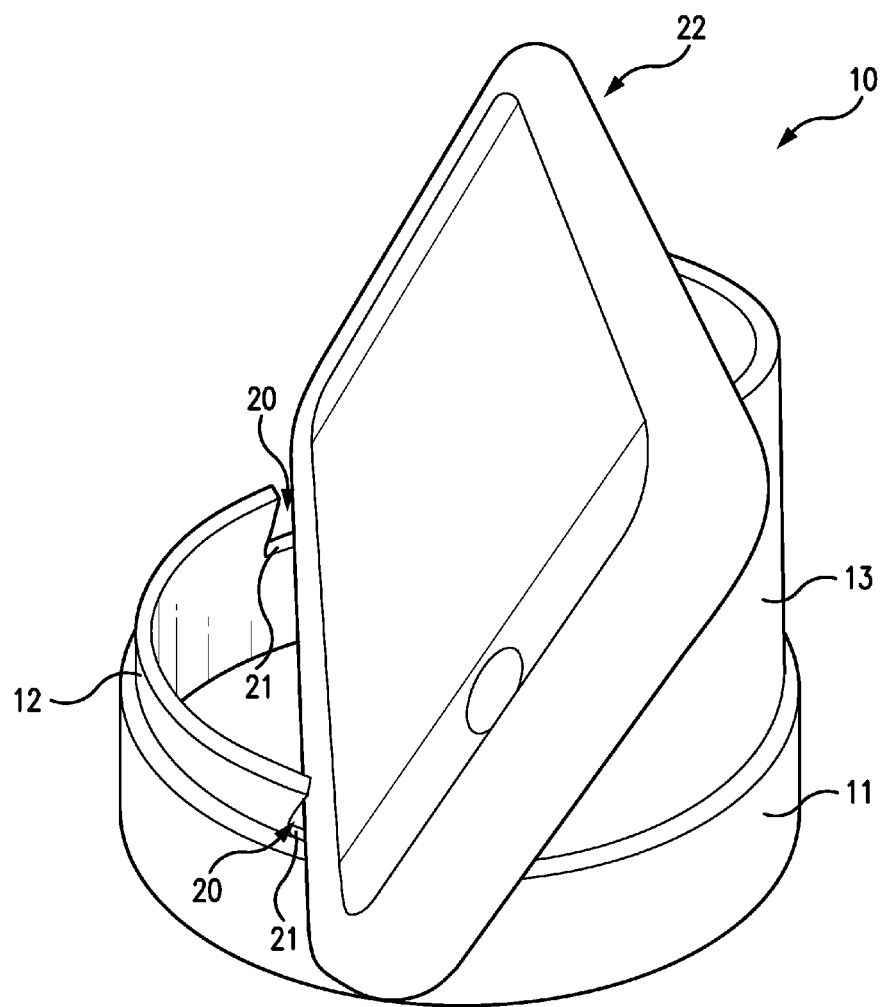
FIG. 2 is a side perspective view of the cradle holding a mobile device.

Referring to FIGS. 1 and 2, the cradle for mobile devices 10 comprises an annular frusto-conical cradle base 11, a front flange 12 and a rear flange 13. The front flange 12 and the rear flange 13 extend continuously circumferentially upward from the cradle base 11. The front flange 12 comprises a crescent-shaped arcuate frusto-conical section subtending a first chord length 14. The front flange 12 has two splayed lateral edges 15, each of which forms an acute first angle 16 with the cradle base 11. The rear flange 13 comprises a crescent-shaped arcuate frusto-conical section subtending a second chord length 17, which is longer than the first chord length 14. The rear flange 13 has two beveled lateral edges 17, each of which forms an acute second angle 19 with the cradle base 11. Between the splayed lateral edges 15 of the front flange 12 and the beveled lateral edges 18 of the rear flange 13 are flange gaps 20, which form a device seat 21 within which the mobile device 22 can rest against the beveled lateral edges 18 of the rear flange 13, while reclining at the acute second angle 19 with respect to the cradle base 11.

Preferably, the acute first angle 16 is equal to the acute second angle 19, such that the splayed lateral edges 15 of the front flange 12 are parallel to the beveled lateral edges 18 of the rear flange 13. For optimal viewing of the display screen of the mobile device 22, the acute first angle 16 and the acute second angle 19 should be in the range of 50 to 70 degrees.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:
1. A cradle for a mobile device, consisting of:
   an annular frusto-conical cradle base, a front flange and a rear flange;
   wherein the front flange and the rear flange extend continuously circumferentially upward from the cradle base;
   wherein the front flange consists of a crescent-shaped arcuate frusto-conical section subtending a first chord length, and wherein the front flange has a convex outer surface and a concave inner surface;
   wherein the front flange has two lateral edges, each of which forms an acute first angle with the cradle base;
   wherein the rear flange consists of a crescent-shaped arcuate frusto-conical section subtending a second chord length, which is longer than the first chord length, and wherein the rear flange has a convex outer surface and a concave inner surface;
   wherein the rear flange has two beveled lateral edges, each of which forms an acute second angle with the cradle base; and
   wherein each splayed lateral edge of the front flange is separated from a proximate beveled lateral edge of the rear flange by a flange gap, such that the flange gaps form a device seat within which the mobile device can rest against the beveled lateral edges of the rear flange, and such that the mobile device can recline at the acute second angle with respect to the cradle base.

2. The cradle of claim 1, wherein the acute first angle is equal to the acute second angle, such that the splayed lateral edges of the front flange are parallel to the beveled lateral edges of rear flange.

3. The cradle of claim 2, wherein the first acute angle and the second acute angle are equal and are in the range of 50 to 70 degrees.

\* \* \* \* \*